H. D. JAMES.
SYSTEM OF CONTROL FOR ELECTRIC MOTORS.
APPLICATION FILED FEB. 3, 1910.
1,010,263.
Patented Nov. 28, 1911.
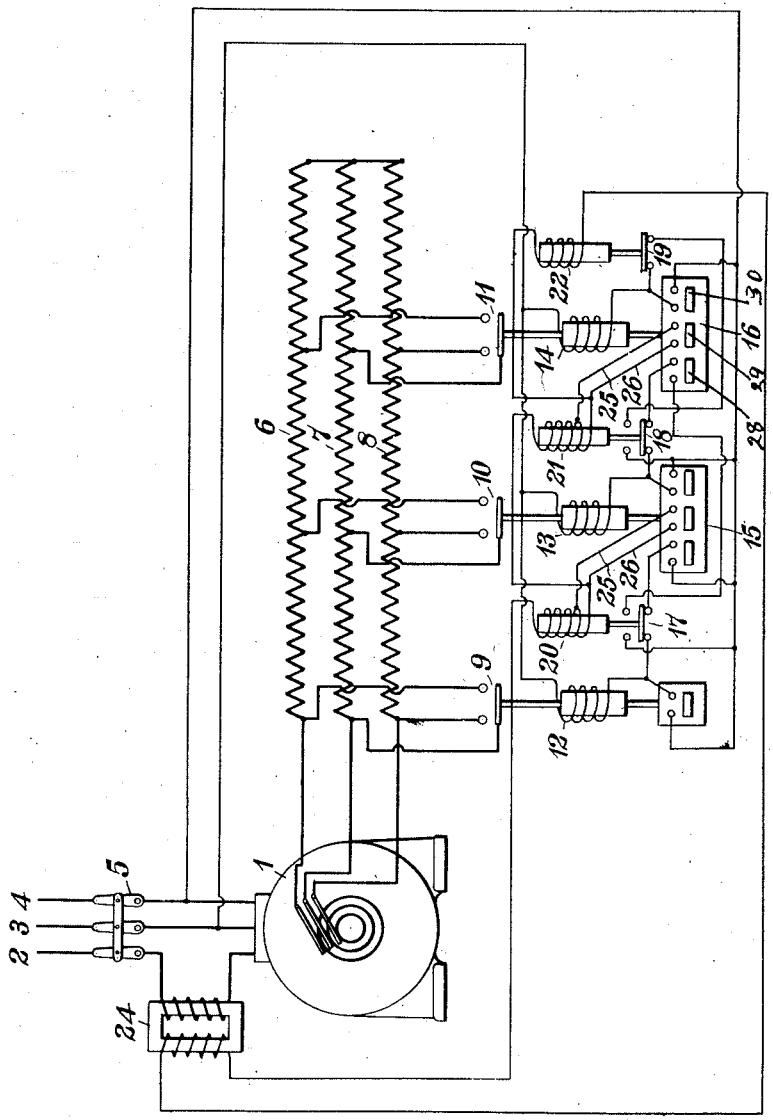

UNITED STATES PATENT OFFICE.

HENRY D. JAMES, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF CONTROL FOR ELECTRIC MOTORS.

1,010,263.

Specification of Letters Patent. Patented Nov. 28, 1911.

Application filed February 3, 1910. Serial No. 541,834.

*To all whom it may concern:*

Be it known that I, HENRY D. JAMES, a citizen of the United States, and a resident of Pittsburgh, in the county of Allegheny and State of Pennsylvania, have invented a new and useful Improvement in Systems of Control for Electric Motors, of which the following is a specification.

My invention relates to systems of control for electric motors, and it has for its object to provide a system that shall embody simple, reliable and effective means for causing acceleration in the speed of a motor without requiring more than a predetermined amount of current from the distributing circuit.

When separately actuated switches are employed in the control of an electric motor, their operation is frequently regulated by means of relay switches that are provided for the purpose of so limiting the rate of acceleration of the motor that it may not take more than a predetermined amount of current from the distributing circuit. As heretofore arranged, such relay switches have been normally closed, and have been caused to open only when the current supplied to the motor has exceeded a predetermined amount. Owing to their inherent slowness of action and to the fact that arcs often occur between their terminals, such relay switches have not invariably effected the desired results and it is the object of the present invention to provide means whereby the desired results may be reliably secured.

The single figure of the accompanying drawing illustrates, diagrammatically, a system of control that embodies my invention.

While the invention is susceptible of application to the control of both direct and alternating current motors, it is here illustrated as employed in the control of a polyphase induction motor 1 that may be connected to a distributing circuit 2—3—4 by means of a switch or circuit-breaker 5, and the circuit of the secondary member of which includes three resistances 6, 7 and 8. The resistances 6, 7 and 8 are regulated in effective value by means of switches 9, 10 and 11 that are connected to suitable points of sub-division thereof, these switches being provided, respectively, with operating or controlling magnet windings 12, 13 and 14, that may be supplied with current from the circuit 2—3—4, or from any other suitable source. The circuits of the windings 12, 13 and 14 are so governed, as to cause the corresponding switches to close in a predetermined order, by means of interlocking switches 15 and 16 that are operated, respectively, by the switches 10 and 11, and also by means of relay switches 17, 18 and 19 that may be regarded as associated, respectively, with the switches 9, 10 and 11. The relay switches 17, 18 and 19 are operated, respectively, by means of magnet windings 20, 21 and 22, that are supplied with current, which is proportionate in amount to that supplied to the primary member of the motor by a series transformer 24. The magnet windings 20, 21 and 22 are all connected in series, and the windings 20 and 21 are provided, at suitable points, with taps 25 and 26 that are connected to contact terminals of the interlocking switches 15 and 16, respectively.

As here shown, the windings 20 and 21 have more convolutions than winding 22, and taps 25 and 26 are attached to the windings 20 and 21 at such points that, when they are connected by the interlocking switches 15 and 16, the effective number of convolutions of the said windings will be reduced to substantially the number in the winding 22, or to any other desired and suitable value. This arrangement is provided for the purpose of permitting the relay switch 18, upon a reduction of the current supplied to the motor, but it will be obvious to those skilled in the art that other means may be provided for effecting the same result.

The operation of the system is as follows: Upon closing the switch or circuit breaker 5, current is supplied to the motor, and, until it falls below a predetermined value, the magnet windings 20, 21 and 22 maintain all three of the relay switches 17, 18 and 19 in their uppermost positions, so that none other of the control circuits are then established, and the resistances 6, 7 and 8 are entirely included in the secondary circuit of the motor. As the motor increases in speed, the current supplied to it falls in value, and the relay switch 19 closes, the relay switches 17 and 18 being still maintained in their uppermost positions, because the number of convolutions of the winding 22 is less than that of the windings 20 and 21.

Upon closing the relay switch 19, a circuit for magnet winding 14 is established from conductor 3, through relay switch 19, and relay switch 18, in its uppermost position, to conductor 4, and the switch 11 is closed, thereby shunting the end portions of the resistances 6, 7 and 8. Upon closing the switch 11, a circuit is established for the winding 14, through conducting segment 28 of the interlocking switch 16 independent of that through relay switches 18 and 19, and the taps 25 and 26 are connected together by conducting segment 29 of the interlocking switch 16, the effective turns of the magnet winding 21 being thereby reduced. The relay switch 18 will, accordingly, drop to its lowermost position when the current supplied to the primary member of the motor falls below a predetermined value, which is less than that at which the relay switch 17 will be permitted to close because of the larger effective number of turns of the winding 20. This value is also preferably approximately that at which switch 19 was permitted to close, though it may be otherwise, if desired.

Upon closing the relay switch 18, the circuit of the magnet winding 13 is established and the switch 10 is closed, thereby shunting additional sections of the resistances 6, 7 and 8. The circuit of the magnet winding 13 extends from conductor 3 of the supply circuit, through relay switch 18, in its lowermost position, conducting segment 30 of the interlocking switch 16, and relay switch 17, in its uppermost position, to supply conductor 4.

The operation of the remainder of the system, including switches 9 and 17, occurs in a manner similar to that described for the switches 10 and 18, and it will be understood that any desired number of switches may be employed and arranged for operation as above set forth.

It should be noted that the resistance-regulating switches are not permitted to close until after the relay switches that are associated therewith are closed, and also that the relay switches 17 and 18 are not permitted to close until the resistance-regulating switches preceding those with which they are respectively associated are closed. But it should be particularly observed that switch 11 cannot close, and, consequently, none of the resistance can be removed from the secondary circuit of the motor unless the relay switch 18 is in its uppermost position and switch 19 is closed. By reason of these arrangements, there is no possibility of energizing any of the magnet windings 12, 13 and 14 until the current supplied to the primary member of the motor has fallen below a predetermined value. Thus, the operation of the switches is reliable, and there is no danger of damaging the motor or of taking an undue amount of current from the distributing circuit.

I claim as my invention:

1. A system of control comprising a plurality of independently actuated regulating switches, relay switches respectively associated with the regulating switches and having actuating windings connected in series relation, and interlocking switches operated by the regulating switches for effecting changes in the ampere turns of the relay actuating windings upon closing the regulating switches respectively preceding those with which the relays are associated.

2. A system of control comprising a plurality of independently actuated regulating switches for regulating the operation thereof, relay switches respectively associated with the regulating switches and having actuating windings connected in series relation, and an interlocking switch operated by each regulating switch for reducing the ampere turns of the actuating winding of the relay that is associated with the next succeeding regulating switch.

3. A system of control comprising a plurality of independently actuated regulating switches, relay switches that are respectively associated with the regulating switches and are permitted to close only when the current traversing a circuit of the system is less than a predetermined value, and interlocking switches operated by the regulating switches which cause each relay switch to close at a smaller value of the said current when the regulating switch preceding that with which it is associated is closed than when the said switch is open.

4. A system of control comprising a plurality of independently actuated regulating switches having controlling windings, relay switches that are respectively associated with the regulating switches and are permitted to establish the circuits of the controlling windings of the switches with which they are respectively associated only when the current traversing a circuit of the system is less than a predetermined amount, and interlocking switches operated by the regulating switches which permit the regulating switches to close only when the relay switches respectively associated therewith and the succeeding relay switches occupy non-corresponding positions.

In testimony whereof, I have hereunto subscribed my name this 26th day of Jan., 1910.

HENRY D. JAMES.

Witnesses:
H. E. McWethy,
B. B. Hines.